US012068120B2

(12) United States Patent
Narayana Pillai et al.

(10) Patent No.: US 12,068,120 B2
(45) Date of Patent: *Aug. 20, 2024

(54) HOUSEHOLD APPLIANCE WITH A USER INTERFACE

(71) Applicant: WHIRLPOOL CORPORATION, Benton Harbor, MI (US)

(72) Inventors: Ajay Ram Narayana Pillai, Saint Joseph, MI (US); Arkadiusz Michal Teclaw, Wroclaw (PL); Priyanka Popat Mali, Maharashtra (IN)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,800

(22) Filed: May 11, 2023

(65) Prior Publication Data

US 2023/0326689 A1 Oct. 12, 2023

Related U.S. Application Data

(63) Continuation of application No. 17/537,912, filed on Nov. 30, 2021, now Pat. No. 11,694,857.

(51) Int. Cl.
*H01H 3/38* (2006.01)
*A47L 15/42* (2006.01)
*H01H 3/12* (2006.01)

(52) U.S. Cl.
CPC ........... *H01H 3/38* (2013.01); *A47L 15/4293* (2013.01); *H01H 3/12* (2013.01); *H01H 2231/012* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | |
|---|---|---|---|
| 3,711,685 | A | 1/1973 | Castle |
| 4,802,779 | A | 2/1989 | Allaire |
| 8,168,908 | B2 | 5/2012 | Heimann |
| 8,178,802 | B2 | 5/2012 | Roose et al. |
| 9,800,241 | B2 | 10/2017 | Ertas et al. |

(Continued)

FOREIGN PATENT DOCUMENTS

| | | | |
|---|---|---|---|
| EP | 2355117 | A1 | 8/2011 |
| WO | 2017114625 | A1 | 7/2017 |

*Primary Examiner* — Ahmed M Saeed
(74) *Attorney, Agent, or Firm* — McGarry Bair PC

(57) ABSTRACT

A method of assembly for a switch within a user interface for a home appliance includes housing a circuit board within the user interface. The circuit board has at least one mechanically actuated switch having a first area. An input interface of the user interface has a button defining a second area, greater than the first area, and having an actuator corresponding to the switch. The button is coupled to at least one of the circuit board or the input interface for relative movement between an actuation position, where the actuator actuates the switch, and a non-actuation position, where the actuator does not actuate the switch.

20 Claims, 9 Drawing Sheets

(56) References Cited

U.S. PATENT DOCUMENTS

| | | | |
|---|---|---|---|
| 10,607,793 | B1 | 3/2020 | Liu et al. |
| 11,694,857 | B2 * | 7/2023 | Narayana Pillai ....... H01H 3/38 200/237 |
| 2010/0025214 | A1 | 2/2010 | Roose et al. |
| 2013/0020185 | A1 | 1/2013 | Zhang et al. |
| 2015/0286295 | A1 | 10/2015 | Pepe |
| 2018/0197698 | A1 | 7/2018 | Chung et al. |
| 2018/0323024 | A1 | 11/2018 | Yuan et al. |

* cited by examiner

HOUSEHOLD APPLIANCE WITH A USER INTERFACE

CROSS-REFERENCE TO RELATED APPLICATION(S)

This application is a continuation of U.S. patent application Ser. No. 17/537,912, filed Nov. 30, 2021, now U.S. Pat. No. 11,694,857, issued Jul. 4, 2023, which is incorporated herein by reference in its entirety.

BACKGROUND

Contemporary household appliances for use in a typical household include a treating chamber for receiving articles for treatment according to a cycle of operation. A controller is configured to implement the cycle of operation. A user interface is operably coupled with the controller and configured to provide user input to the controller. The controller includes a circuit board having a plurality of switches. In one example, the switches are mechanically actuated switches.

The user interface includes an input interface for receiving the user input, which can include a variety of buttons, knobs, and the like for receiving user input and cycle or parameter selections. The plurality of buttons can correspond with the plurality of switches on the circuit board, such that each button selectively actuates one or more of the switches. In one example, the input interface can include a plurality of buttons of varying sizes, such as including at least one button having an increased width compared to the other buttons to provide an improved user experience and interaction with the input interface. In such an example, it is desirable to provide such an input interface having buttons of varying sizes while minimizing increases in the complexity and/or cost of the input interface or its manufacture.

BRIEF DESCRIPTION

An aspect of the present disclosure relates to a method comprising housing a circuit board within a user interface, the circuit board having at least one mechanically actuated switch having a first area and with an input interface of the user interface having a button defining a second area, greater than the first area, the button defining a major body axis and a minor body axis, the major body axis having first and second lateral ends at opposite sides of the major body axis, and having an actuator corresponding to the switch, the actuator positioned proximate to the first lateral end, and movably coupling the button, by a stabilizing element, to at least one of the circuit board or input interface for relative movement between an actuation position, where the actuator actuates the switch, and a non-actuation position, where the actuator does not actuate the switch, wherein the stabilizing element prevents depressive force receivable at the second lateral end of the button from non-uniform depression of the button along the major body axis toward the circuit board, as the button moves from the non-actuation position to the actuation position.

Another aspect of the present disclosure relates to a method of assembly for a switch within a user interface for a home appliance, the user interface configured to provide user input to a controller configured to implement a cycle of operation within a treating chamber of the home appliance, the method comprising forming an input interface of the user interface, the user interface housing a circuit board having at least one mechanically actuated switch having a first area, and the input interface having a button defining a second area, greater than the first area, the button defining a major body axis and a minor body axis, the major body axis having first and second lateral ends at opposite sides of the major body axis, and having an actuator corresponding to the switch, the actuator positioned proximate to the first lateral end, and movably coupling the button, by a stabilizing element, to at least one of the circuit board or input interface for relative movement between an actuation position, where the actuator actuates the switch, and a non-actuation position, where the actuator does not actuate the switch, wherein the stabilizing element prevents depressive force receivable at the second lateral end of the button from non-uniform depression of the button along the major body axis toward the circuit board, as the button moves from the non-actuation position to the actuation position.

DETAILED DESCRIPTION

Figure 1:
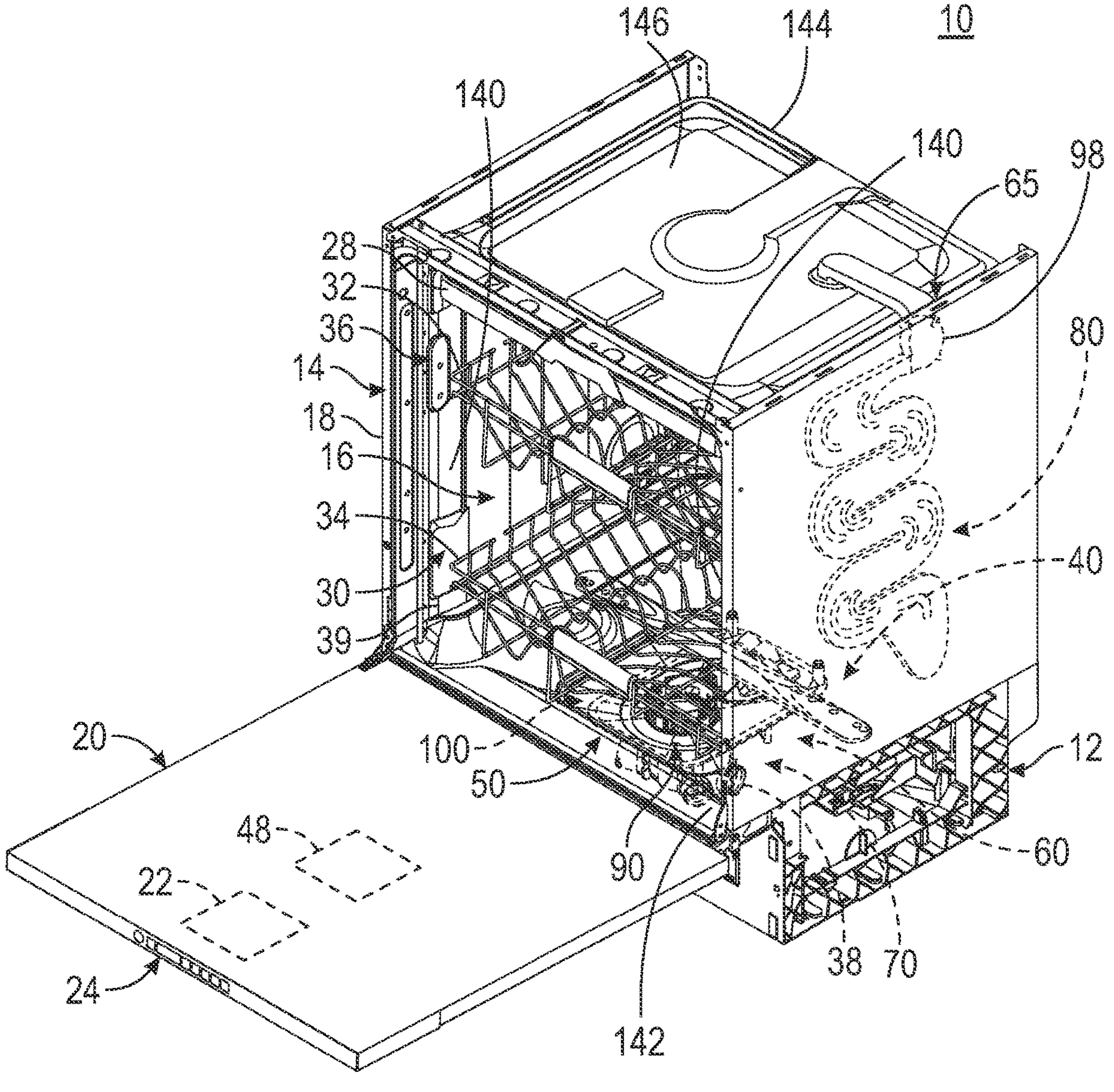
FIG. 1 is a right-side perspective view of a dish treating appliance, illustrated herein as a dishwasher, having multiple systems for implementing an automatic cycle of operation, including a spray system.

FIG. 1 illustrates an automatic dish treating appliance 10, illustrated herein as a dishwasher 10, capable of implementing an automatic cycle of operation to treat dishes. As used in this description, the term "dish(es)" is intended to be generic to any item, single or plural, that can be treated in the dishwasher 10, including, without limitation, dishes, plates, pots, bowls, pans, glassware, silverware, and other utensils. As illustrated, the dishwasher 10 is a built-in dishwasher 10 implementation, which is designed for mounting under a countertop or other work surface. However, this description is applicable to other dishwasher implementations such as a stand-alone, multi-tub-type, drawer-type, or a sink-type, for example, as well as dishwashers having varying widths, sizes, and capacities. The dishwasher 10 shares many features of a conventional automatic dishwasher, which may not be described in detail herein except as necessary for a complete understanding of aspects of the disclosure.

The dishwasher 10 has a variety of systems, some of which are controllable, to implement the automatic cycle of operation. A chassis or cabinet is provided to support the variety of systems needed to implement the automatic cycle of operation and can define an interior. As illustrated, for a built-in implementation, the chassis or cabinet includes a frame in the form of a base 12 on which is supported an open-faced tub 14, which at least partially defines a treating chamber 16, having an access opening, illustrated herein as an open face 18, for receiving the dishes. The open-faced tub 14 can have at least a pair of opposing side walls 140 that are spaced apart from one another, such as by being spaced apart by a bottom wall 142, a rear wall 144, and/or a top wall 146. The pair of opposing side walls 140, the bottom wall 142, the rear wall 144, and the top wall 146 can further be thought of as at least partially defining the treating chamber 16, and optionally also the open face 18 to serve as the access opening.

A closure in the form of a door assembly 20 can be hingedly or pivotally mounted to the base 12, or to any other suitable portion of the cabinet or chassis or of the tub 14, for movement relative to the tub 14 between opened and closed positions to selectively open and close the open face 18 of the tub 14. In one example, the door assembly 20 is mounted for pivoting movement about a pivot axis relative to the base 12, the tub 14, or the open face 18. In the opened position, a user can access the treating chamber 16, as shown in FIG. 1, while, in the closed position (not shown), the door assembly 20 covers or closes the open face 18 of the treating chamber 16. Thus, the door assembly 20 provides selective accessibility to the treating chamber 16 for the loading and unloading of dishes or other items.

The chassis or cabinet, as in the case of the built-in dishwasher implementation, can be formed by other parts of the dishwasher 10, like the tub 14 and the door assembly 20, in addition to a dedicated frame structure, like the base 12, with them all collectively forming a uni-body frame by which the variety of systems are supported. In other implementations, like the drawer-type dishwasher, the chassis can be a tub that is slidable relative to a frame, with the closure being a part of the chassis or the countertop of the surrounding cabinetry. In a sink-type implementation, the sink forms the tub and the cover closing the open top of the sink forms the closure. Sink-type implementations are more commonly found in recreational vehicles.

The systems supported by the chassis, while essentially limitless, can include a dish holding system 30, spray system 40, recirculation system 50, drain system 60, water supply system 70, air supply system 65, heating system 90, and filter system 100. These systems are used to implement one or more treating cycles of operation for the dishes, for which there are many, one of which includes a traditional automatic wash cycle.

A basic traditional automatic cycle of operation for the dishwasher 10 has a wash phase, where a detergent/water mixture is recirculated and then drained, which is then followed by a rinse phase where water alone or with a rinse agent is recirculated and then drained. An optional drying phase can follow the rinse phase. More commonly, the automatic wash cycle has multiple wash phases and multiple rinse phases. The multiple wash phases can include a pre-wash phase where water, with or without detergent, is sprayed or recirculated on the dishes, and can include a dwell or soaking phase. There can be more than one pre-wash phases. A wash phase, where water with detergent is recirculated on the dishes, follows the pre-wash phases. There can be more than one wash phase; the number of which can be sensor controlled based on the amount of sensed soils in the wash liquid. One or more rinse phases will follow the wash phase(s), and, in some cases, come between wash phases. The number of wash phases can also be sensor controlled based on the amount of sensed soils in the rinse liquid. The amounts of water, treating chemistry, and/or rinse aid used during each of the multiple wash or rinse steps can be varied. The wash phases and rinse phases can include the heating of the water, even to the point of one or more of the phases being hot enough for long enough to sanitize the dishes. A drying phase can follow the rinse phase(s). The drying phase can include a drip dry, a non-heated drying step (so-called "air only"), heated dry, condensing dry, air dry or any combination. These multiple phases or steps can also be performed by the dishwasher 10 in any desired combination.

A controller 22 can also be included in the dishwasher 10 and operably couples with and controls the various components of the dishwasher 10 to implement the cycles of operation. The controller 22 can be located within the door assembly 20 as illustrated, or it can alternatively be located somewhere within the chassis. The controller 22 can also be operably coupled with a control panel or user interface 24 for receiving user-selected inputs and communicating information to the user. The user interface 24 can provide an input and output function for the controller 22. While the user interface 24 is illustrated in FIG. 1 as being provided on a top surface of the door assembly 20, it will be understood that the user interface 24 can be provided at any suitable location on the door assembly 20, such as on a front surface of the door assembly 20.

The user interface 24 can include operational controls such as one or more knobs, dials, lights, switches, displays, touch screens and the like for communicating with the user, such as enabling a user to input commands, such as a cycle of operation, to the controller 22 and to receive information, for example about the selected cycle of operation. For example, the displays can include any suitable communication technology including that of a liquid crystal display (LCD), a light-emitting diode (LED) array, or any suitable display that can convey a message to the user. The user can enter different types of information including, without limitation, cycle selection and cycle parameters, such as cycle options. Other communications paths and methods can also be included in the dishwasher 10 and can allow the controller 22 to communicate with the user in a variety of ways. For example, the controller 22 can be configured to send a text message to the user, send an electronic mail to the user, or provide audio information to the user either through the dishwasher 10 or utilizing another device such as a mobile phone.

The controller 22 can include the machine controller and any additional controllers provided for controlling any of the components of the dishwasher 10. For example, the controller 22 can include the machine controller and a motor controller. Many known types of controllers can be used for the controller 22. It is contemplated that the controller is a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), can be used to control the various components.

The dish holding system 30 can include any suitable structure or structures for receiving or holding dishes within the treating chamber 16. Exemplary dish holders are illustrated in the form of an upper dish rack 32 and lower dish rack 34, commonly referred to as "racks", which are located within the treating chamber 16. The upper dish rack 32 and the lower dish rack 34 each define an interior and are typically mounted for slidable movement in and out of the treating chamber 16 through the open face 18 for case of loading and unloading. In one example, it is common for the upper dish rack 32 to be slidably mounted within and to the tub 14 by the use of a suitable drawer withdrawal assembly, such as by the use of drawer guides, slides, or rails 36, while the lower dish rack 34 is instead typically provided with wheels or rollers 38 that can roll along a travel path 39 defined by at least a portion of the dishwasher 10. For example, it is typical for the lower dish rack 34 to be slidable along the travel path 39 such that the lower dish rack 34 can roll along the travel path 39 and then continue to roll onto the door assembly 20, when the door assembly 20 is in the opened position and allows for withdrawal of the dish racks 32, 34.

By way of further example, in such a case, it is also typical that the travel path 39 can include a type of rails 39, but that rails 39 for the lower dish rack 34 may differ in structure from the rails 36 for the upper dish rack 32, and in particular such that the rails 39 may be provided simply as a ledge or a surface formed by the tub 14, such as formed or carried by the side walls 140 or the bottom wall 142 of the tub 14. By providing the rails 39 for the lower dish rack 34 as a simpler support surface, such as a ledge, rather than a more restrictive or enclosing structure such as the rails 36, the rails 39 are better able to accommodate movement or instability of the lower dish rack 34 as the lower dish rack 34 rolls onto the door assembly 20, going from the static, stable tub 14 to the movable door assembly 20. In this way, the rails 39 allow more tolerance for movement as the lower dish rack 34 rolls along the door assembly 20.

In addition, dedicated dish holders can also be provided. One such dedicated dish holder is a third level rack 28 located above the upper dish rack 32. Like the upper dish rack 32, the third level rack 28 is slidably mounted to the tub 14 with drawer guides/slides/rails 36. The third level rack 28 is typically used to hold utensils, such as tableware, spoons, knives, spatulas, etc., in an on-the-side or flat orientation. However, the third level rack 28 is not limited to holding utensils. If an item can fit in the third level rack 28, it can be washed in the third level rack 28. The third level rack 28 generally has a much shorter height or lower profile than the upper and lower dish racks 32, 34. Typically, the height of the third level rack 28 is short enough that a typical glass cannot be stood vertically in the third level rack 28 and the third level rack 28 still be slid into the treating chamber 16.

Another dedicated dish holder can be a utensil or silverware basket (not shown), which is typically located in the treating chamber 16 and carried by one of the upper or lower dish racks 32, 34 or mounted to the door assembly 20. The silverware basket typically holds utensils and the like in an upright orientation as compared to the on-the-side or flat orientation of the third level rack 28. More than one silverware basket can be provided with the dishwasher 10.

A dispenser assembly 48 is provided to store and dispense treating chemistry, e.g. detergent, anti-spotting agent, etc., into the treating chamber 16. The dispenser assembly 48 can be mounted on an inner surface of the door assembly 20, as shown, or can be located at other positions within the chassis or treating chamber 16, such that the dispenser assembly 48 is positioned to be accessed by the user for refilling of the dispenser assembly 48, whether it is necessary to refill the dispenser assembly 48 before each cycle (i.e. for a single use dispenser) or only periodically (i.e. for a bulk dispenser). The dispenser assembly 48 can dispense one or more types of treating chemistries. The dispenser assembly 48 can be a single-use dispenser, which holds a single dose of treating chemistry, or a bulk dispenser, which holds a bulk supply of treating chemistry and which is adapted to dispense a dose of treating chemistry from the bulk supply during the cycle of operation, or a combination of both a single use and bulk dispenser. The dispenser assembly 48 can further be configured to hold multiple different treating chemistries. For example, the dispenser assembly 48 can have multiple compartments defining different chambers in which treating chemistries can be held.

Figure 2:
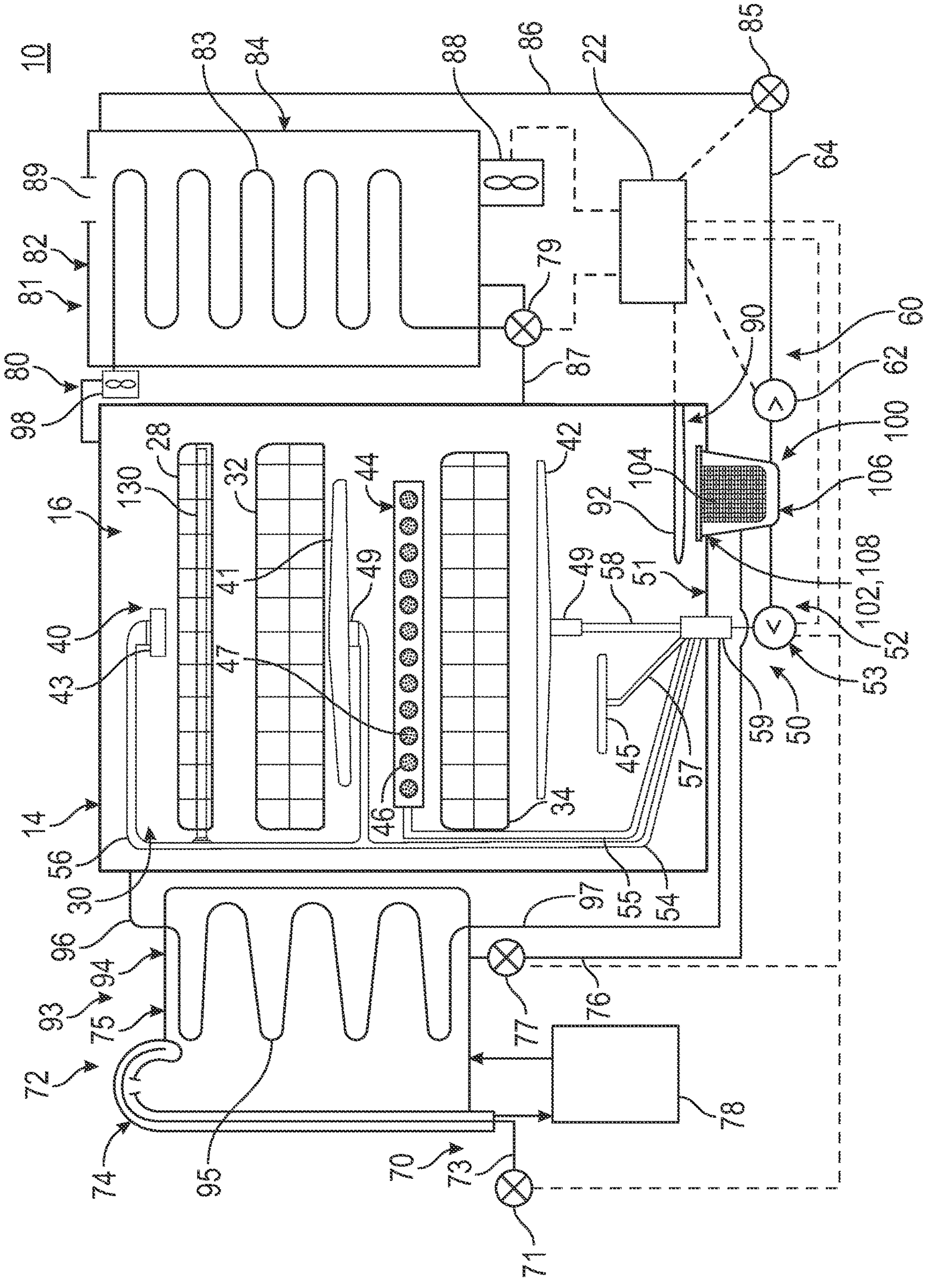
FIG. 2 is a schematic view of the dishwasher of FIG. 1 and illustrating at least some of the systems.

Turning to FIG. 2, the spray system 40 is provided for spraying liquid in the treating chamber 16 and can have multiple spray assemblies or sprayers 41, 42, 43, 44, 45, 130, some of which can be dedicated to a particular one of the dish holders, to particular area of a dish holder, to a particular type of cleaning, or to a particular level of cleaning, etc. The sprayers 41, 42, 43, 44, 45, 130 can be fixed or movable, such as rotating, relative to the treating chamber 16 or dish holder. Exemplary sprayers 41, 42, 43, 44, 45, 130 are illustrated and include an upper spray arm 41, a lower spray arm 42, a third level sprayer 43, a deep-clean sprayer 44, and a spot sprayer 45. The upper spray arm 41 and lower spray arm 42 can be rotating spray arms, located below the upper dish rack 32 and lower dish rack 34, respectively, and rotate about a generally centrally located and vertical axis. In one non-limiting example, at least one drive assembly, illustrated herein as at least one motor 49, is operably coupled to one of or to each of the upper spray arm 41 and the lower spray arm 42 in order to control and drive rotation of the lower spray arm 42. The third level sprayer 43 is located above the third level rack 28. The third level sprayer 43 is illustrated as being fixed, but could move, such as in rotating. In addition to the third level sprayer 43 or in place of the third level sprayer 43, a sprayer 130 can be located at least in part below a portion of the third level rack 28, though it will be understood that such a sprayer 130 can be provided adjacent any of the racks 28, 32, 34. The sprayer 130 is illustrated as a fixed tube, carried by the third level rack 28, but could move, such as in rotating about a longitudinal axis.

The deep-clean sprayer 44 is a manifold extending along a rear wall of the tub 14 and has multiple nozzles 46, with multiple apertures 47, generating an intensified and/or higher pressure spray than the upper spray arm 41, the lower spray arm 42, or the third level sprayer 43. The nozzles 46 can be fixed or can move, such as by way of rotating. The spray emitted by the deep-clean sprayer 44 defines a deep clean zone, which, as illustrated, would extend along a rear side of the lower dish rack 34. Thus, dishes needing deep cleaning, such as dishes with baked-on food, can be positioned in the lower dish rack 34 to face the deep-clean sprayer 44. The deep-clean sprayer 44, while illustrated as only one unit on a rear wall of the tub 14, could comprise multiple units and/or extend along multiple portions, including different walls, of the tub 14, and can be provided above, below, or beside any of the dish holders 28, 32, 34 wherein deep cleaning is desired.

The spot sprayer 45, like the deep-clean sprayer 44, can emit an intensified and/or higher pressure spray, especially to a discrete location within one of the dish holders 28, 32, 34. While the spot sprayer 45 is shown below the lower dish rack 34, it could be adjacent any part of any dish holder 28, 32, 34 or along any wall of the tub 14 where special cleaning is desired. In the illustrated location below the lower dish rack 34, the spot sprayer 45 can be used independently of or in combination with the lower spray arm 42. The spot sprayer 45 can be fixed or can move, such as in rotating.

These sprayers 41, 42, 43, 44, 45, 130 are illustrative examples of suitable sprayers and are not meant to be limiting as to the type of suitable sprayers 41, 42, 43, 44, 45,

130. Additionally, it will be understood that not all of the exemplary sprayers 41, 42, 43, 44, 45, 130 need be included within the dishwasher 10, and that less than all of the sprayers 41, 42, 43, 44, 45, 130 described can be included in a suitable dishwasher 10.

The recirculation system 50 recirculates the liquid sprayed into the treating chamber 16 by the sprayers 41, 42, 43, 44, 45, 130 of the spray system 40 back to the sprayers 41, 42, 43, 44, 45, 130 to form a recirculation loop or circuit by which liquid can be repeatedly and/or continuously sprayed onto dishes in the dish holders 28, 32, 34. The recirculation system 50 can include a sump 51 and a pump assembly 52. The sump 51 collects the liquid sprayed in the treating chamber 16 and can be formed by a sloped or recess portion of the bottom wall 142 of the tub 14. The pump assembly 52 can include one or more pumps such as recirculation pump 53. The sump 51 can also be a separate module that is affixed to the bottom wall and include the pump assembly 52.

Multiple supply conduits 54, 55, 56, 57, 58 fluidly couple the sprayers 41, 42, 43, 44, 45, 130 to the recirculation pump 53. A recirculation valve 59 can selectively fluidly couple each of the conduits 54, 55, 56, 57, 58 to the recirculation pump 53. While each sprayer 41, 42, 43, 44, 45, 130 is illustrated as having a corresponding dedicated supply conduit 54, 55, 56, 57, 58, one or more subsets, comprising multiple sprayers from the total group of sprayers 41, 42, 43, 44, 45, 130, can be supplied by the same conduit, negating the need for a dedicated conduit 54, 55, 56, 57, 58 for each sprayer 41, 42, 43, 44, 45, 130. For example, a single conduit can supply the upper spray arm 41 and the third level sprayer 43. Another example is that the sprayer 130 is supplied liquid by the conduit 56, which also supplies the third level sprayer 43.

The recirculation valve 59, while illustrated as a single valve, can be implemented with multiple valves. Additionally, one or more of the conduits 54, 55, 56, 57, 58 can be directly coupled to the recirculation pump 53, while one or more of the other conduits 54, 55, 56, 57, 58 can be selectively coupled to the recirculation pump 53 with one or more valves. There are essentially an unlimited number of plumbing schemes to connect the recirculation system 50 to the spray system 40. The illustrated plumbing is not limiting.

The drain system 60 drains liquid from the treating chamber 16. The drain system 60 includes a drain pump 62 fluidly coupling the treating chamber 16 to a drain line 64. As illustrated, the drain pump 62 fluidly couples the sump 51 to the drain line 64.

While separate recirculation 53 and drain pumps 62 are illustrated, a single pump can be used to perform both the recirculating and the draining functions, such as by configuring the single pump to rotate in opposite directions, or by providing a suitable valve system. Alternatively, the drain pump 62 can be used to recirculate liquid in combination with the recirculation pump 53. When both a recirculation pump 53 and drain pump 62 are used, the drain pump 62 is typically more robust than the recirculation pump 53 as the drain pump 62 tends to have to remove solids and soils from the sump 51, unlike the recirculation pump 53, which tends to recirculate liquid which has solids and soils filtered away to at least some extent.

A water supply system 70 is provided for supplying fresh water to the dishwasher 10 from a water supply source, such as a household water supply via a household water valve 71. The water supply system 70 includes a water supply unit 72 having a water supply conduit 73 with a siphon break 74 or an air break 74. While the water supply conduit 73 can be directly fluidly coupled to the tub 14 or any other portion of the dishwasher 10, the water supply conduit 73 is shown fluidly coupled to a supply tank 75, which can store the supplied water prior to use. The supply tank 75 is fluidly coupled to the sump 51 by a supply line 76, which can include a controllable valve 77 to control when water is released from the supply tank 75 to the sump 51.

The supply tank 75 can be conveniently sized to store a predetermined volume of water, such as a volume required for a phase of the cycle of operation, which is commonly referred to as a "charge" of water. The storing of the water in the supply tank 75 prior to use is beneficial in that the water in the supply tank 75 can be "treated" in some manner, such as softening or heating prior to use.

A water softener 78 can be provided with the water supply system 70 to soften the fresh water. The water softener 78 is shown fluidly coupling the water supply conduit 73 to the supply tank 75 so that the supplied water automatically passes through the water softener 78 on the way to the supply tank 75. However, the water softener 78 could directly supply the water to any other part of the dishwasher 10 than the supply tank 75, including directly supplying the tub 14. Alternatively, the water softener 78 can be fluidly coupled downstream of the supply tank 75, such as in-line with the supply line 76. Wherever the water softener 78 is fluidly coupled, it can be done so with controllable valves, such that the use of the water softener 78 is controllable and not mandatory.

An air supply system 65 is provided to aid in the treating of the dishes during the cycle of operation by supplying air to at least a portion of the dishwasher 10, a non-limiting example of which includes the treating chamber 16. The air supply system 65 can include a variety of assemblies, pathways, and circuits for supplying air to different portions of the dishwasher 10 and for different purposes within the dishwasher 10, such that the air supply system 65 can be thought of as comprising all of the air supplying or air circulating portions of the dishwasher 10. In one non-limiting example, the air supply system 65 comprises a drying system 80 that is provided to aid in the drying of the dishes during the drying phase. The drying system 80 as illustrated, by way of non-limiting example, includes a condensing assembly 81 having a condenser 82 formed of a serpentine conduit 83 with an inlet fluidly coupled to an upper portion of the tub 14 and an outlet fluidly coupled to a lower portion of the tub 14, whereby moisture laden air within the tub 14 is drawn from the upper portion of the tub 14, passed through the serpentine conduit 83, where liquid condenses out of the moisture laden air and is returned to the treating chamber 16 where it ultimately evaporates or is drained via the drain pump 62. The serpentine conduit 83 can be operated in an open loop configuration, where the air is exhausted to atmosphere, a closed loop configuration, where the air is returned to the treating chamber 16, or a combination of both by operating in one configuration and then the other configuration. A fan or blower 98 can be fluidly coupled with the serpentine conduit 83 to move air through the serpentine conduit 83. It will also be understood that the serpentine conduit 83 is not limited to having a serpentine shape and can instead be provided with any suitable size and shape.

To enhance the rate of condensation, the temperature difference between the exterior of the serpentine conduit 83 and the moisture laden air can be increased by cooling the exterior of the serpentine conduit 83 or the surrounding air. To accomplish this, an optional cooling tank 84 is added to the condensing assembly 81, with the serpentine conduit 83 being located within the cooling tank 84. The cooling tank 84 is fluidly coupled to at least one of the spray system 40, recirculation system 50, drain system 60, or water supply system 70, such that liquid can be supplied to the cooling tank 84. The liquid provided to the cooling tank 84 from any of the systems 40, 50, 60, 70 can be selected by source and/or by phase of cycle of operation such that the liquid is at a lower temperature than the moisture laden air or even lower than the ambient air.

As illustrated, the liquid is supplied to the cooling tank 84 by the drain system 60. A valve 85 fluidly connects the drain line 64 to a supply conduit 86 fluidly coupled to the cooling tank 84. A return conduit 87 fluidly connects the cooling tank 84 back to the treating chamber 16 via a return valve 79. In this way a fluid circuit is formed by the drain pump 62, drain line 64, valve 85, supply conduit 86, cooling tank 84, return valve 79 and return conduit 87 through which liquid can be supplied from the treating chamber 16, to the cooling tank 84, and back to the treating chamber 16. Alternatively, the supply conduit 86 could fluidly couple to the drain line 64 if re-use of the water is not desired.

To supply cold water from the household water supply via the household water valve 71 to the cooling tank 84, the water supply system 70 would first supply cold water to the treating chamber 16, then the drain system 60 would supply the cold water in the treating chamber 16 to the cooling tank 84. It should be noted that the supply tank 75 and cooling tank 84 could be configured such that one tank performs both functions.

The drying system 80 can use ambient air, instead of cold water, to cool the exterior of the serpentine conduit 83. In such a configuration, a blower 88 is connected to the cooling tank 84 and can supply ambient air to the interior of the cooling tank 84. The cooling tank 84 can have a vented top 89 to permit the passing through of the ambient air to allow for a steady flow of ambient air blowing over the serpentine conduit 83.

The cooling air from the blower 88 can be used in lieu of the cold water or in combination with the cold water. The cooling air will be used when the cooling tank 84 is not filled with liquid. Advantageously, the use of cooling air or cooling water, or combination of both, can be selected based on the site-specific environmental conditions. If ambient air is cooler than the cold water temperature, then the ambient air can be used. If the cold water is cooler than the ambient air, then the cold water can be used. Cost-effectiveness can also be taken into account when selecting between cooling air and cooling water. The blower 88 can be used to dry the interior of the cooling tank 84 after the water has been drained. Suitable temperature sensors for the cold water and the ambient air can be provided and send their temperature signals to the controller 22, which can determine which of the two is colder at any time or phase of the cycle of operation.

A heating system 90 is provided for heating water used in the cycle of operation. The heating system 90 includes a heater 92, such as an immersion heater 92, located in the treating chamber 16 at a location where it will be immersed by the water supplied to the treating chamber 16, such as within or near the sump 51. However, it will also be understood that the heater 92 need not be an immersion heater 92; it can also be an in-line heater located in any of the conduits. There can also be more than one heater 92, including both an immersion heater 92 and an in-line heater. The heater 92 can also heat air contained in the treating chamber 16. Alternatively, a separate heating element (not shown) can be provided for heating the air circulated through the treating chamber 16.

The heating system 90 can also include a heating circuit 93, which includes a heat exchanger 94, illustrated as a serpentine conduit 95, located within the supply tank 75, with a supply conduit 96 supplying liquid from the treating chamber 16 to the serpentine conduit 95, and a return conduit 97 fluidly coupled to the treating chamber 16. The heating circuit 93 is fluidly coupled to the recirculation pump 53 either directly or via the recirculation valve 59 such that liquid that is heated as part of a cycle of operation can be recirculated through the heat exchanger 94 to transfer the heat to the charge of fresh water residing in the supply tank 75. As most wash phases use liquid that is heated by the heater 92, this heated liquid can then be recirculated through the heating circuit 93 to transfer the heat to the charge of water in the supply tank 75, which is typically used in the next phase of the cycle of operation.

A filter system 100 is provided to filter un-dissolved solids from the liquid in the treating chamber 16. The filter system 100 includes a coarse filter 102 and a fine filter 104, which can be a removable basket 106 residing the sump 51, with the coarse filter 102 being a screen 108 circumscribing the removable basket 106. Additionally, the recirculation system 50 can include a rotating filter in addition to or in place of the either or both of the coarse filter 102 and fine filter 104. Other filter arrangements are contemplated, such as an ultrafiltration system.

Figure 3:
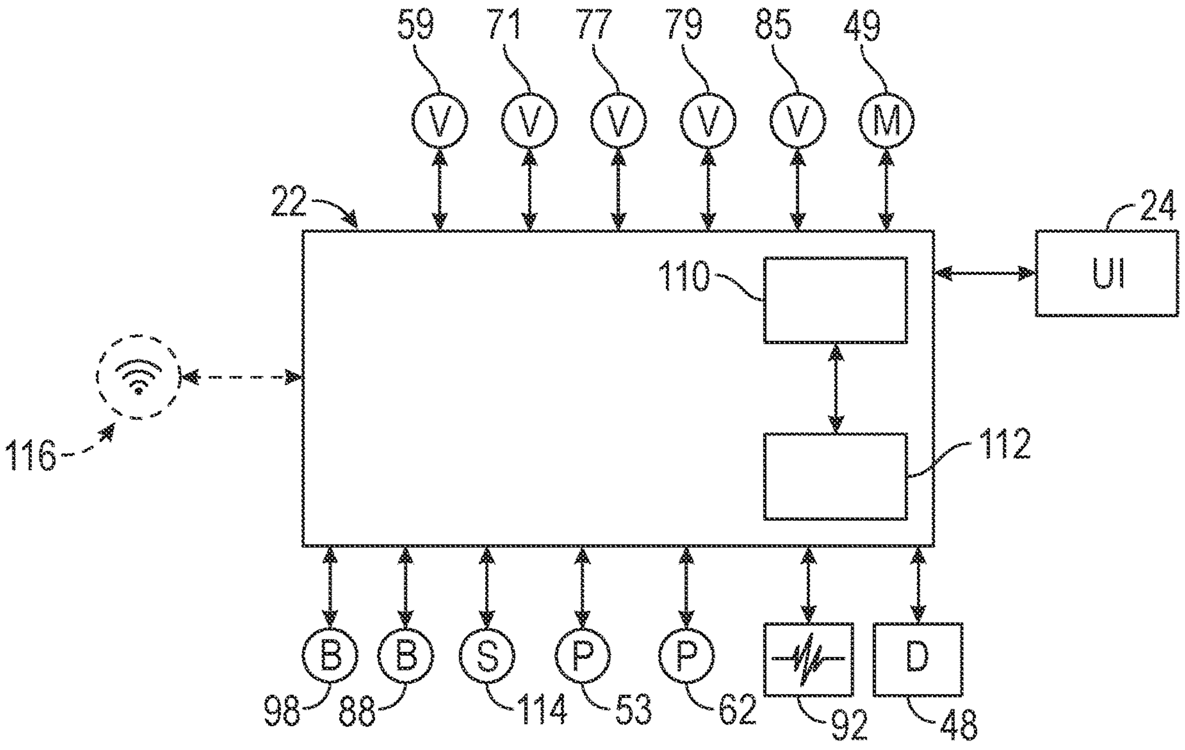
FIG. 3 is a schematic view of a controller of the dishwasher of FIGS. 1 and 2.

As illustrated schematically in FIG. 3, the controller 22 can be coupled with the heater 92 for heating the wash liquid during a cycle of operation, the drain pump 62 for draining liquid from the treating chamber 16, the recirculation pump 53 for recirculating the wash liquid during the cycle of operation, the user interface 24 for receiving user selected inputs and communicating information to the user, the dispenser assembly 48 for selectively dispensing treating chemistry to the treating chamber 16, the at least one motor 49 for selectively actuating rotation of the upper spray arm 41 and/or the lower spray arm 42, the blower 98 for providing air through the serpentine conduit 83, and the blower 88 for providing air into the cooling tank 84. The controller 22 can also communicate with the recirculation valve 59, the household water valve 71, the controllable valve 77, the return valve 79, and the valve 85 to selectively control the flow of liquid within the dishwasher 10. Optionally, the controller 22 can include or communicate with a wireless communication device 116.

The controller 22 can be provided with a memory 110 and a central processing unit (CPU) 112. The memory 110 can be used for storing control software that can be executed by the CPU 112 in completing a cycle of operation using the dishwasher 10 and any additional software. For example, the memory 110 can store a set of executable instructions including one or more pre-programmed automatic cycles of operation that can be selected by a user and executed by the dishwasher 10. Examples, without limitation, of cycles of operation include: wash, heavy duty wash, delicate wash, quick wash, pre-wash, refresh, rinse only, timed wash, dry, heavy duty dry, delicate dry, quick dry, or automatic dry, which can be selected at the user interface 24. The memory 110 can also be used to store information, such as a database or table, and to store data received from one or more components of the dishwasher 10 that can be communicably coupled with the controller 22. The database or table can be used to store the various operating parameters for the one or more cycles of operation, including factory default values for the operating parameters and any adjustments to them by the control assembly or by user input.

The controller 22 can also receive input from one or more sensors 114 provided in one or more of the assemblies or systems of the dishwasher 10 to receive input from the sensors 114, which are known in the art and not shown for simplicity. Non-limiting examples of sensors 114 that can be communicably coupled with the controller 22 include, to name a few, an ambient air temperature sensor, a treating chamber temperature sensor, such as a thermistor, a water supply temperature sensor, a door open/close sensor, a moisture sensor, a chemical sensor, and a turbidity sensor to determine the soil load associated with a selected grouping of dishes, such as the dishes associated with a particular area of the treating chamber 16.

Figure 4:
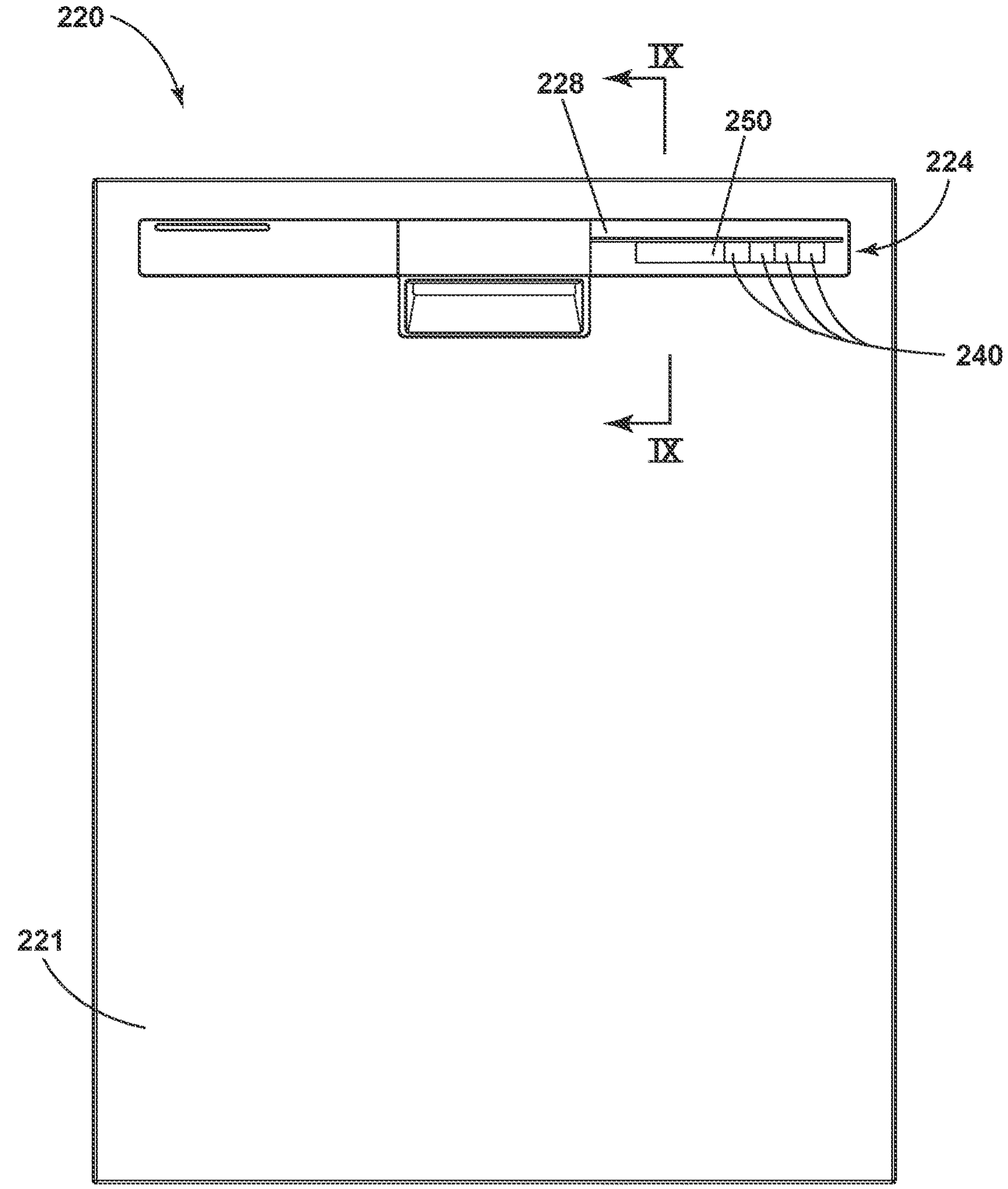
FIG. 4 is a front view of an example of a door for use with the dishwasher of FIG. 1 and including an example of an input interface.

Turning now to FIG. 4, an example of a door assembly 220 that can be used within the dishwasher 10, such as by being used for the door assembly 20, is illustrated. The door assembly 220 includes a user interface 224 that can be provided on the door assembly 220. The user interface 224 comprises a plurality of buttons 240, including at least one stabilized button 250. In one non-limiting example, the user interface 224 is provided within a front panel or front surface 221 of the door assembly 220, though it will also be understood that the user interface 224 can be provided on the top surface of the door assembly 220, as illustrated in FIG. 1, or can be provided along another edge of the door assembly 220. Further by way of non-limiting example, it is contemplated that the user interface 224 can alternatively be provided as a physically separate component that is attached with the door assembly 220, such as a fascia 228. In such an example, the fascia 228 containing the user interface 224 can be provided within a surface of the door assembly 220, such as the front surface 221, such that the fascia 228 at least partially defines the user interface 224, or at least partially defines an opening within which the user interface 224 is received, provided with the front surface 221 of the door assembly 220. However, it will be understood that such an arrangement including the fascia 228 is not required and that the user interface 224 can instead be provided directly with a surface of the door assembly 220.

As illustrated, the at least one stabilized button 250 has a first dimension that is greater than a second dimension of the stabilized button 250, though it will be understood that such a shape is not limiting. For example, the stabilized button 250 can have any suitable shape, non-limiting examples of which include rectangular, square, oval, or circular. Further, while the illustrated stabilized button 250 is shown as having the first dimension, here the side-to-side width, that is greater than the second dimension, here the top-to-bottom height, it will be understood that such an arrangement of dimensions is not limiting, such that the stabilized button 250 could have a height that is greater than its width, or could have a height that is equal to its width. Further yet, while the stabilized button 250 is illustrated as having a different shape than the other buttons 240, specifically by having a width greater than that of the width of at least one of the other buttons 240, it will be understood that this is not limiting and that the stabilized button 250 can have a shape that is the same as at least one of the other buttons 240, or even the same as all of the other buttons 240.

Figure 5:
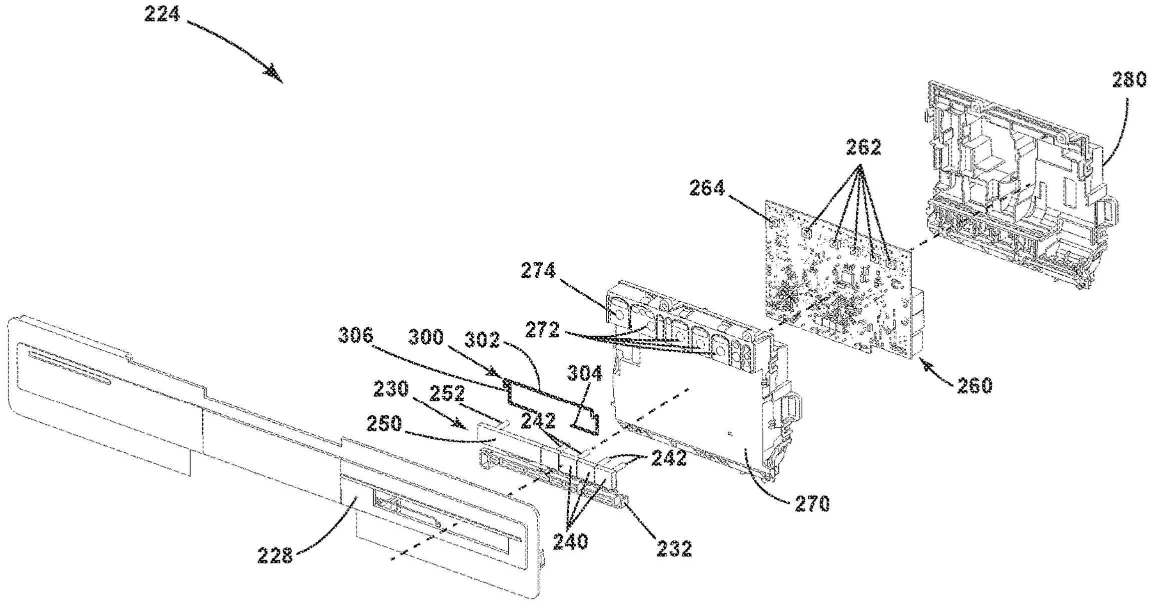
FIG. 5 is an exploded perspective view of the input interface for use with the door of FIG. 4.

Referring now to FIG. 5, an exploded view of the user interface 224 better illustrates that at least the buttons 240 and the at least one stabilized button 250 can form a part of an input interface 230 of the user interface 224, with the input interface 230 overlying a circuit board 260 that is housed within a front housing 270 and a rear housing 280. A stabilizing element 300 is coupled with the stabilized button 250. The fascia 228 can provide a decorative cover for the user interface 224 and includes an opening within which the buttons 240, 250 of the user interface 224 are received.

More specifically, the input interface 230 comprises a body 232 from which the buttons 240 and the stabilized button 250 extend, such that the buttons 240 and the stabilized button 250 are depressible relative to the body 232. An actuator 242 is provided and extends from the rear of each of the buttons 240, including a stabilized button actuator 252 extending from a rear surface 251 (FIG. 6) of the stabilized button 250. In one non-limiting example, the input interface 230 can be provided as a button tree, with each of the actuators 242, 252 provided as button stems.

The actuators 242, 252 extend rearwardly from the buttons 240, 250 toward the circuit board 260, which can be a printed circuit board (PCB). The circuit board 260 comprises a plurality of mechanically actuated switches 262, including at least one switch 262 corresponding with each of the buttons 240 and at least one stabilized button switch 264 corresponding with the stabilized button 250. In the assembled user interface 224, the switches 262 are aligned with the actuators 242 of the buttons 240, while the stabilized button switch 264 is aligned with the actuator 252 of the stabilized button 250.

The circuit board 260 can be received within an interior of a housing comprising at least the front housing 270 and the rear housing 280. The front housing 270 and the rear housing 280 couple together to enclose the circuit board 260 in order to protect the circuit board 260 and associated electronics from liquid within the dishwasher 10. The front housing 270 comprises a plurality of through openings 272 and at least one stabilized button through opening 274. The through openings 272, 274 are aligned with the switches 262, 264 and with the actuators 242, 252 such that the actuators 242, 252 extend through the through openings 272, 274 toward the switches 262, 264, and further such that the actuators 242, 252 can selectively contact and actuate the switches 262, 264 when the buttons 240 or the stabilized button 250 are depressed from a resting, non-actuation position to a depressed, actuation position.

Figure 6:
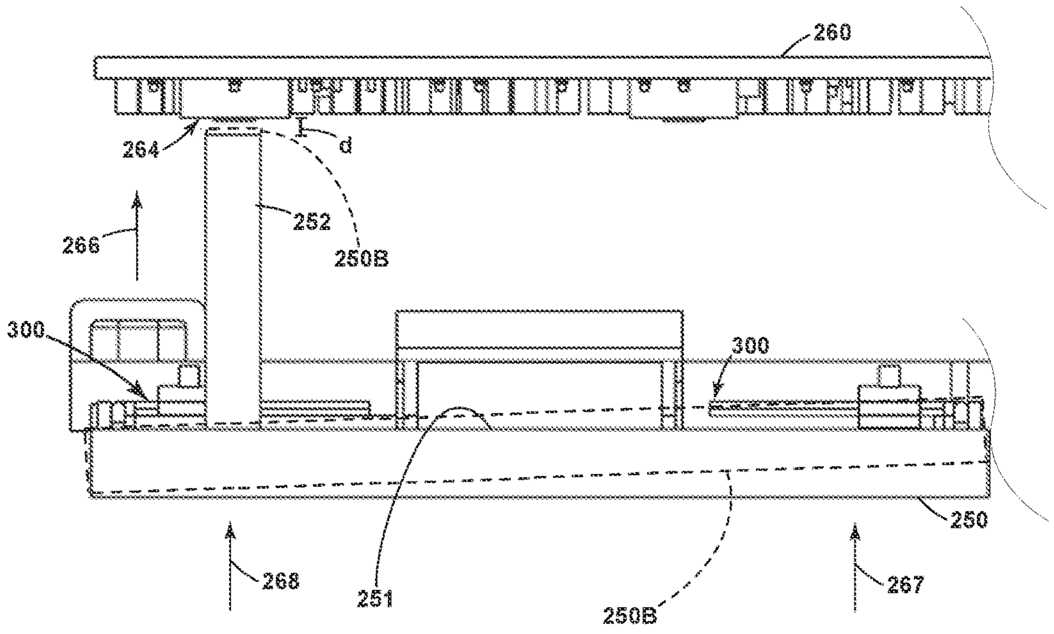
FIG. 6 is a top view of a portion of the input interface of FIG. 5.

Because the at least one stabilized button 250 defines a surface area greater than that of the cross-sectional area of the corresponding stabilized button actuator 252, it is possible that depression of the stabilized button 250 by a user may not sufficiently depress the stabilized button 250 to allow the stabilized button actuator 252 to actuate the stabilized button switch 264, depending on where along the side-to-side width of the stabilized button 250 the user presses and how far that press point is laterally spaced from the position of the stabilized button actuator 252, as will be discussed in more detail with respect to FIG. 6. In order to address this potential issue, a stabilizing element 300 can be included with the input interface 230, and specifically can be operably coupled with the stabilized button 250, in order to provide additional support or rigidity to ensure uniform depression toward the circuit board 260 along the entire side-to-side width of the stabilized button 250.

The stabilizing element 300 can be any suitable element that provides enhanced rigidity or support to ensure uniform depression of the stabilized button 250 toward the circuit board 260 along the entire side-to-side width of the stabilized button 250, while movably coupling the stabilized button 250 to the input interface 230, and specifically to the body 232. In one non-limiting example, the stabilizing element 300 comprises a metal wire, such as a steel wire.

The stabilizing element 300 can define an upper edge 302 and a lower edge 304 spaced from one another by a pair of opposing side edges 306. In the case that the stabilizing element 300 is a steel wire, the steel wire can be bent to form at least the upper edge 302, the lower edge 304, and the side edges 306. While the stabilizing element 300 is illustrated as having a discontinuous lower edge 304, it is also contemplated that the stabilizing element 300 could have a continuous lower edge 304 such that the stabilizing element 300 forms a continuous loop or other similar structure.

Referring now to FIG. 6 for further detail, the stabilized button switch 264 defines a first area, including defining a first side-to-side width, while the stabilized button 250 defines a second area, including defining a second side-to-side width, the second area and the second width being greater than the first area and the first width. Further, the stabilized button actuator 252 defines an area, including defining a side-to-side or cross-sectional width, that can be the same as or close to the first area and first width of the stabilized button switch 264, such that the second area and the second width of the stabilized button 250 is also greater than the area and width of the stabilized button actuator 252. In a non-limiting example, the second area and the second width can be at least five times greater than the first area and the first width of either or of both of the stabilized button actuator 252 and the stabilized button switch 264, further at least ten times greater than the first area and the first width of either or of both of the stabilized button actuator 252 and the stabilized button switch 264.

When the stabilized button 250 has such an area and width greater than the stabilized button actuator 252, as well as greater than the stabilized button switch 264 that is selectively actuated by the stabilized button actuator 252, it is possible that depression of the stabilized button 250 toward the circuit board 260 by a user may not be uniform along the entire side-to-side width of the stabilized button 250, depending on where along the side-to-side width of the stabilized button 250 the user depresses the stabilized button 250 and how far such a press point is laterally spaced from the position of the stabilized button actuator 252.

For example, in the resting, non-actuation position of the stabilized button 250 as shown in FIG. 6, the stabilized button actuator 252 is spaced from the stabilized button switch 264 by a depression distance d. When a user presses the stabilized button 250, and in particular when the user presses the stabilized button 250 at the point overlying or adjacent the stabilized button actuator 252, as indicated by the arrow 268, the stabilized button 250, and therefore also the stabilized button actuator 252 are depressed toward the circuit board 260 in the direction indicated by the arrow 266 to close the depression distance d, bringing the stabilized button actuator 252 into contact with the stabilized button switch 264 to actuate the stabilized button switch 264 in the depressed, actuation position of the stabilized button 250. However, in the case that the user presses the stabilized button 250 at a point spaced laterally away from the stabilized button actuator 252, such as the point indicated by the arrow 267, if the stabilizing element 300 were not included, the button 250 could be depressed non-uniformly along its side-to-side width, as illustrated by the dashed outline 250B, such that the end of the button 250 adjacent the arrow 267 moves toward the circuit board 260, but the end opposite the arrow 267 may not move as far toward the circuit board 260 and thus may not travel toward the circuit board 260 enough to close the depression distance d and actuate the switch 264. This may be even more likely to occur when the actuator 252 is laterally offset from a midpoint of the side-to-side width of the button 250 as illustrated, though it will be understood that this non-uniform depression can still occur at the outer edges of the button 250, even when the actuator 252 is positioned at the midpoint of the width of the button 250.

In order to avoid this inconsistency in distance traveled toward the circuit board 260 at each opposing end of the button 250 and to ensure that there is uniform depression and consistent travel toward the circuit board 260 along the full side-to-side width of the stabilized button 250, and of the stabilized button actuator 252, no matter where along the width of the stabilized button 250 the user presses, the stabilizing element 300 is included to ensure that depression toward the circuit board 260 is uniform and consistent along the width of the stabilized button 250. Due to the rigidity of the stabilizing element 300, and in particular of the upper edge 302 of the stabilizing element 300 along the side-to-side width of the stabilized button 250, as well as due to the coupling of the stabilizing element 300 to the body 232 adjacent its opposing side edges 306, as better seen in FIGS. 7-8, the coupling of the stabilized button 250 with the stabilizing element 300 ensures that the depression of the stabilized button 250 toward the circuit board 260 is uniform along the full side-to-side width of the stabilized button 250, regardless of where on the stabilized button 250 the user may press.

Figure 7:
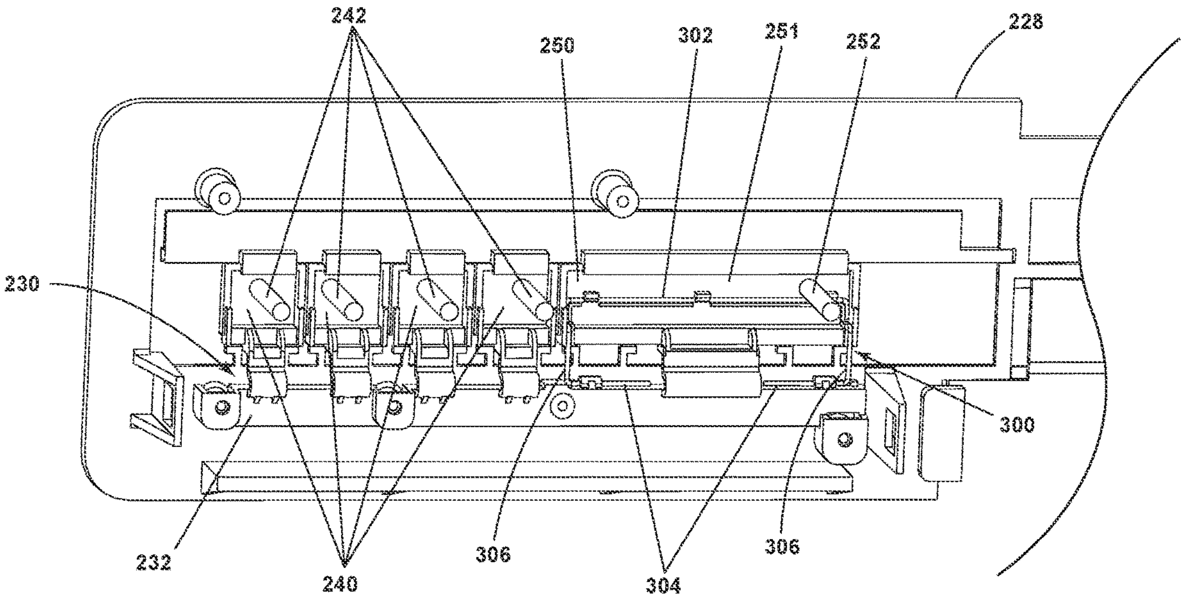
FIG. 7 is a rear perspective view of a portion of the input interface of FIG. 5.

FIG. 7 illustrates a non-exploded view of the input interface 230 from the rear, and with the circuit board 260 and the front and rear housings 270, 280 of the user interface 224 removed so that the coupling of the stabilizing element 300 with the input interface 230 and with the stabilized button 250 can be seen more clearly. Specifically, the upper edge 302 of the stabilizing element 300 is coupled to the rear surface 251 of the stabilized button 250, while the lower edge 304 of the stabilizing element 300 is coupled to the body 232 of the input interface 230. Further, it can be seen that the stabilizing element 300, and in particular the upper edge 302 of the stabilizing element 300, is coextensive with the width of the stabilized button 250 and is positioned generally at a mid-point of the vertical height of the stabilized button 250. By way of non-limiting example, the stabilizing element 300 extends along at least 75% of the width of the stabilized button 250, further extends along at least 90% of the width of the stabilized button 250, further yet along at least 95% of the width of the stabilized button 250.

Figure 8:
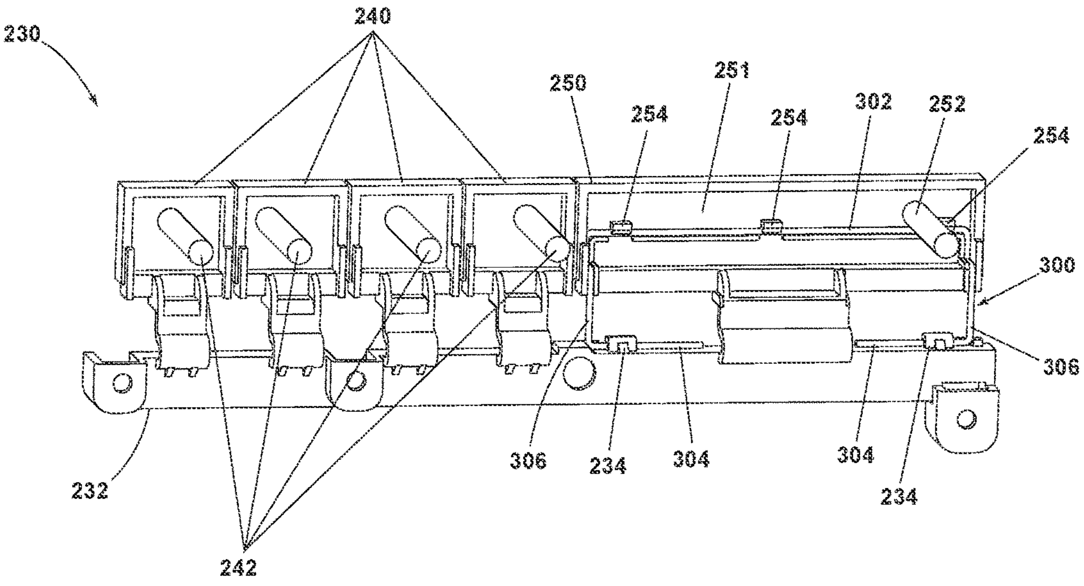
FIG. 8 is a rear perspective view of a portion of the input interface of FIG. 7.

Turning now to FIG. 8, the input interface 230 is shown from the rear again, but with the fascia 228 further removed and in a further enlarged view for additional clarity on the coupling of the stabilizing element 300 with the input interface 230 and with the stabilized button 250 such that the stabilized button 250 is movably coupled with the body 232. The stabilized button 250 further comprises at least one upper clip 254 that extends from the rear surface 251 of the stabilized button 250 to retain the stabilizing element 300 against the rear surface 251. In one non-limiting example, the at least one upper clip 254 retains the stabilizing element 300 such that the upper edge 302 of the stabilizing element 300 is rotatably retained by the at least one upper clip 254. Further, the body 232 of the input interface 230 further comprises at least one lower clip 234 that extends from the body 232 to retain the stabilizing element 300 against the body 232. In one non-limiting example, the at least one lower clip 234 retains the stabilizing element 300 such that the lower edge 304 of the stabilizing element 300 is rotatably retained by the at least one lower clip 234. With this rotatable coupling of the stabilizing element 300 to both the stabilized button 250 and the body 232, the stabilized button 250 is permitted to move freely between the resting, non-actuation position and the actuation position, while the rigidity provided by the stabilizing element 300 along the side-to-side width of the stabilized button 250 ensures even travel of the stabilized button 250, regardless of where on the stabilized button 250 the user depresses.

Figure 9:
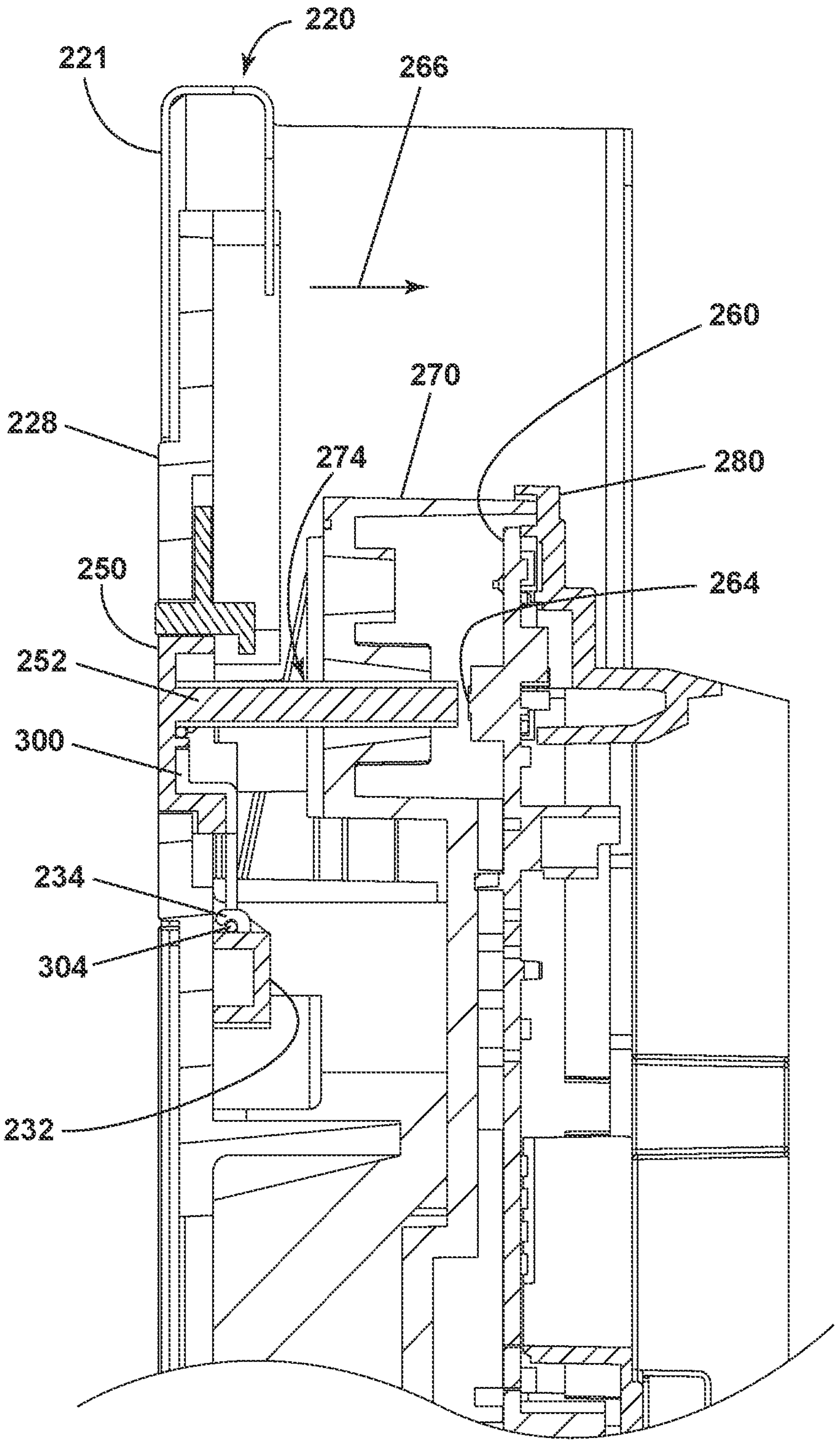
FIG. 9 is a side cross-sectional view of the input interface of FIG. 5.

Turning now to FIG. 9 and to the operation of the stabilized button 250 and the stabilizing element 300, the door assembly 220 and the user interface 224 are shown in a cross-sectional view with the stabilized button 250, the stabilizing element 300, and the actuator 252 shown in a non-depressed, non-actuation position. In this non-actuation position, the stabilized button 250 is not depressed with respect to the fascia 228, and the stabilized button actuator 252 is not in contact with and does not actuate the stabilized button switch 264. Though the stabilized button actuator 252 is slightly spaced from the stabilized button switch 264, the stabilized button actuator 252 is still received within and protruding through the stabilized button through opening 274.

When the stabilized button 250 is depressed relative to the fascia 228, the stabilizing element 300 ensures even travel of the stabilized button 250 toward the circuit board 260 along the width of the stabilized button 250 as the stabilized button 250 moves slightly toward the circuit board 260, and specifically as the stabilized button actuator 252 moves slightly forward through the stabilized button through opening 274 in the front housing 270, in the direction indicated by the arrow 266, to come into contact with the stabilized button switch 264. When the stabilized button actuator 252 reaches the actuation position, where the stabilized button actuator 252 contacts the stabilized button switch 264, the stabilized button actuator 252 actuates the stabilized button switch 264 to provide the input associated with the stabilized button 250 to the controller 22.

In moving from the non-depressed, non-actuation position to the depressed, actuation position, the rigidity of the stabilizing element 300 extending along substantially the full width of the stabilized button 250 ensures that, whether the stabilized button 250 is depressed at a point adjacent the stabilized button actuator 252, or at an end of the stabilized button 250 opposite the stabilized button actuator 252, the rearward travel of the stabilized button 250, and thus also of the stabilized button actuator 252, toward the circuit board 260 is consistent along the full width of the stabilized button 250. In this way, consistent and reliable actuation of the stabilized button switch 264 is ensured, regardless of where along the width or height of the stabilized button 250 the user may push.

The aspects described herein set forth an input interface with at least one stabilized button for use within a home or household appliance and coupled with a stabilizing element for improved performance of the stabilized button. Such an input interface can provide an improved user experience by allowing for the inclusion of input buttons of varying sizes, while still ensuring consistency in operation and reducing the chance that a portion of the stabilized button could be depressed without successfully actuating the associated switch. Furthermore, by providing the stabilizing element in the form of a steel wire, it provides a relatively simple and cost-effective solution, as opposed to other attempted solutions which may significantly increase complexity or cost of manufacture. The inclusion of the stabilizing element also ensures a smooth, even depression of the stabilized button toward the circuit board across the full width of the stabilized button, reducing the feel of wobble of a stabilized button that may be perceived as undesirable by a user.

It will also be understood that various changes and/or modifications can be made without departing from the spirit of the present disclosure. By way of non-limiting example, although the present disclosure is described for use with a dishwasher user interface, it will be recognized that the input interface having such a stabilized button and stabilizing element can be used with many suitable types of home appliances, including dishwashers of other configurations, laundry treating appliances, microwaves, ovens, refrigerators, or any other type of household appliance with a similar user interface.

To the extent not already described, the different features and structures of the various aspects can be used in combination with each other as desired. That one feature is not illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. While aspects of the disclosure have been specifically described in connection with certain specific details thereof, it is to be understood that this is by way of illustration and not of limitation. Reasonable variation and modification are possible within the scope of the forgoing disclosure and drawings without departing from the spirit of the disclosure, which is defined in the appended claims.

What is claimed is:

1. A method comprising:

housing a circuit board within a user interface, the circuit board having at least one mechanically actuated switch having a first area and with an input interface of the user interface having a button defining a second area, greater than the first area, the button defining a major body axis and a minor body axis, the major body axis having first and second lateral ends at opposite sides of the major body axis, and having an actuator corresponding to the at least one mechanically actuated switch, the actuator positioned proximate to the first lateral end; and movably coupling the button, by a stabilizing element, to at least one of the circuit board or the input interface for relative movement between an actuation position, where the actuator actuates the at least one mechanically actuated switch, and a non-actuation position, where the actuator does not actuate the at least one mechanically actuated switch;

wherein the stabilizing element prevents depressive force receivable at the second lateral end of the button from non-uniform depression of the button along the major body axis toward the circuit board, as the button moves from the non-actuation position to the actuation position.

2. The method of claim 1 wherein the stabilizing element is rigid along the second area.

3. The method of claim 1 wherein the second area is at least five times greater than the first area.

4. The method of claim 3 wherein the second area is at least ten times greater than the first area.

5. The method of claim 1, further comprising aligning the actuator with the at least one mechanically actuated switch.

6. The method of claim 1 wherein the stabilizing element comprises a steel wire bent to form at least an upper edge and a lower edge.

7. The method of claim 6 wherein the movably coupling the button, by the stabilizing element, to the at least one of the circuit board or the input interface comprises rotatably coupling the upper edge of the stabilizing element with a rear surface of the button.

8. The method of claim 7 wherein the movably coupling the button, by the stabilizing element, to the at least one of the circuit board or the input interface further comprises rotatably coupling the lower edge of the stabilizing element with the input interface.

9. The method of claim 8 wherein the steel wire forms a continuous loop or the lower edge of the steel wire is discontinuous.

10. The method of claim 1 wherein the housing the circuit board within the user interface comprises providing the circuit board within an interior defined by a housing included with the user interface, the housing further defining an opening aligned with the at least one mechanically actuated switch.

11. The method of claim 10 wherein the actuator extends through the opening to contact the at least one mechanically actuated switch when the button is in the actuation position.

12. A method of assembly for a switch within a user interface for a home appliance, the user interface configured to provide user input to a controller configured to implement a cycle of operation within a treating chamber of the home appliance, the method comprising:

forming an input interface of the user interface, the user interface housing a circuit board having the switch, the switch having a first area, and the input interface having a button defining a second area, greater than the first area, the button defining a major body axis and a minor body axis, the major body axis having first and second lateral ends at opposite sides of the major body axis, and having an actuator corresponding to the switch, the actuator positioned proximate to the first lateral end; and movably coupling the button, by a stabilizing element, to at least one of the circuit board or the input interface for relative movement between an actuation position, where the actuator actuates the switch, and a non-actuation position, where the actuator does not actuate the switch;

wherein the stabilizing element prevents depressive force receivable at the second lateral end of the button from non-uniform depression of the button along the major body axis toward the circuit board, as the button moves from the non-actuation position to the actuation position.

13. The method of claim 12 wherein the stabilizing element comprises a steel wire bent to form at least an upper edge and a lower edge.

14. The method of claim 13 wherein the movably coupling the button, by the stabilizing element, to the at least one of the circuit board or the input interface comprises rotatably coupling the upper edge of the stabilizing element with a rear surface of the button.

15. The method of claim 14 wherein the movably coupling the button, by the stabilizing element, to the at least one of the circuit board or the input interface comprises rotatably coupling the lower edge of the stabilizing element with the input interface.

16. The method of claim 15 wherein the steel wire forms a continuous loop.

17. The method of claim 15 wherein the lower edge of the steel wire is discontinuous.

18. The method of claim 12 wherein the user interface housing the circuit board comprises providing the circuit board within an interior defined by a housing included with the user interface, the housing further defining an opening aligned with the switch.

19. The method of claim 18 wherein the actuator extends through the opening to contact the switch when the button is in the actuation position.

20. A method comprising:

housing a circuit board within a user interface, the circuit board having a mechanically actuated switch having a first area and with an input interface of the user interface having a button defining a second area, greater than the first area, the button defining a major body axis and a minor body axis, the major body axis having first and second lateral ends at opposite sides of the major body axis, and having an actuator corresponding to the mechanically actuated switch, the actuator positioned proximate to the first lateral end; and coupling the button, via a stabilizing element, to at least one of the circuit board or the input interface, the button configured for relative movement between an actuation position, where the actuator actuates the mechanically actuated switch, and a non-actuation position, where the actuator does not actuate the mechanically actuated switch and wherein the stabilizing element prevents depressive force receivable at the second lateral end of the button from non-uniform depression of the button along the major body axis toward the circuit board, as the button moves from the non-actuation position to the actuation position.

* * * * *